United States Patent
Sato

(10) Patent No.: US 12,277,646 B2
(45) Date of Patent: Apr. 15, 2025

(54) METHOD FOR GENERATING POINT CLOUD DATA AND DATA GENERATING APPARATUS

(71) Applicant: SEIKO EPSON CORPORATION, Tokyo (JP)

(72) Inventor: Akinobu Sato, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 163 days.

(21) Appl. No.: 18/159,828

(22) Filed: Jan. 26, 2023

(65) Prior Publication Data

US 2023/0237735 A1 Jul. 27, 2023

(30) Foreign Application Priority Data

Jan. 27, 2022 (JP) .................. 2022-010819

(51) Int. Cl.
*G06T 17/00* (2006.01)
*G06V 10/764* (2022.01)

(52) U.S. Cl.
CPC .......... *G06T 17/00* (2013.01); *G06V 10/764* (2022.01)

(58) Field of Classification Search
CPC ......... G06T 17/00; G06T 7/521; G06T 5/70; G06T 7/55; G06T 2207/10028; G06V 10/764; G06V 20/647; G01S 17/894
USPC ...................................................... 345/419
See application file for complete search history.

(56) References Cited

U.S. PATENT DOCUMENTS

| 9,037,396 B2* | 5/2015 | Pack ................. G01C 21/20 701/409 |
| 2010/0226590 A1* | 9/2010 | Yoo ..................... G06T 5/70 382/275 |
| 2017/0039436 A1* | 2/2017 | Chen ............... G06V 10/454 |
| 2019/0266779 A1* | 8/2019 | Kulkarni ............ G06T 15/04 |
| 2019/0266792 A1* | 8/2019 | Yao .................... G06T 7/55 |
| 2020/0074652 A1* | 3/2020 | Yan ................... G06T 7/586 |
| 2021/0065420 A1* | 3/2021 | Orvalho ............ G06T 15/04 |
| 2021/0272301 A1* | 9/2021 | Lin ................... G06T 7/521 |
| 2021/0358189 A1* | 11/2021 | Orvalho ............ G06T 15/04 |

OTHER PUBLICATIONS

Charles R. Qi et al., "Frustum PointNets for 3D Object Detection from RGB-D Data", https://openaccess.thecvf.com/content_cvpr_2018/papers/Qi_Frustum_PointNets_for_CVPR_2018_paper.pdf, Apr. 13, 2018, 15 Pages.

* cited by examiner

*Primary Examiner* — Sheree N Brown
(74) *Attorney, Agent, or Firm* — Harness, Dickey & Pierce, P.L.C.

(57) ABSTRACT

Color image data is generated by capturing an image of a target object. Pixels of the color image data are classified to generate classified image data. The kernels have sizes according to a plurality of sub-target objects formed of pixels that belong to categories. First data on a point cloud is generated by capturing an image of the target object using an infrared stereo camera. The first data is projected onto a plane to generate second data on a point cloud. A point of the point cloud in the second data is associated with a pixel in the classified image data. Third data on a point cloud in a three-dimensional coordinate system is generated from the first data by filtering information on the positions of the points in the first data. The filtering uses the kernels according to the categories of the points contained in the first data.

6 Claims, 9 Drawing Sheets

$(x,y,z) \rightarrow (u,v)$ $(x,y,z)$ Is=1

| | STEREO CAMERA | ToF CAMERA | STRUCTURED ILLUMINATION AND CAMERA |
|---|---|---|---|
| IMAGING DISTANCE | B | A | C |
| DEPTH ACCURACY | B(0.1~10cm) | B(1~10cm) | A(0.1~1mm) |
| LOAD ON PC | C | B | C |
| REAL-TIME RESPONSE | B | B | C |
| IMAGE CAPTURING AT DARK PLACE | D | B | A |
| IMAGE CAPTURING OUTDOORS | B | C | D |
| COMPACTNESS | A | A | D |
| COST | B | A | B |

METHOD FOR GENERATING POINT CLOUD DATA AND DATA GENERATING APPARATUS

The present application is based on, and claims priority from JP Application Serial Number 2022-010819, filed Jan. 27, 2022, the disclosure of which is hereby incorporated by reference herein in its entirety.

BACKGROUND

1. Technical Field

The present disclosure relates to a method for generating point cloud data and a data generating apparatus.

2. Related Art

There is a related-art technology for generating point clouds identified in a three-dimensional coordinate system based on real target objects by using light detection and ranging (LiDAR) and a stereo camera. In the technology described in C. R. Qi, W. Liu, C. Wu, H. Su and L. J. Guibas, "Frustum Point Nets for 3D object detection from RGB-D data", Proc. 2018 IEEE/CVF Conf. on Computer Vision and Pattern Recognition, 2018, PointNet is used to segment point clouds thereof for recognition of the shape and distance of objects present around a control target. The control target can be controlled based on the recognition. For example, a car is driven automatically so as not to collide with other objects present around the car. A robot is driven so as not to collide with structures around the robot. The robot can also correctly grasp a target object at a position where the target object should be grasped.

To train in advance a network that achieves segmentation of point clouds, data on point clouds generated from computer aided design (CAD) data on target objects and formed of points each of which is labeled is used as teacher data. In the data on the point clouds formed of the labeled points, information on the labels is generated in accordance with the target objects to be recognized in environmental recognition.

The teacher data, however, needs to be generated from the CAD data for each of the target objects present in the environment to be recognized. Generating the teacher data therefore involves a large burden. In addition, teacher data for a flexible elastic object, which does not maintain the shape specified by CAD data when placed in the real world, cannot be generated based on the CAD data.

The inventors of the present application have examined methods for generating teacher data by using LiDAR and a stereo camera to generate data on point clouds based on real target objects and labeling each point of the point clouds. When point clouds are generated based on real target objects, however, noise is inevitably introduced when the position of each point in the coordinate system is identified, particularly when the position in the depth direction is calculated. When data containing such noise is used as the teacher data to train a network that achieves the segmentation, the accuracy of the segmentation decreases.

The inventors of the present application have examined the following approach for reducing the noise contained in point cloud data. That is, when the density of a point cloud contained in a certain sub-region among point clouds identified in a three-dimensional coordinate system is lower than a density specified in advance, the point cloud contained in the sub-region is considered as noise and removed from the point cloud data. The approach, however, has the following problem. For example, a time-of-flight (ToF) camera, such as LiDAR, radially emits light and generates point cloud data based on the period spent until the camera receives the reflected light. Therefore, when there are target objects having the same size, a high-density point cloud is generated from the light reflected off a target object closer to the ToF camera, whereas a low-density point cloud is generated from the light reflected off a target object farther from the ToF camera. The approach described above is therefore problematic in that points on the target object farther from the ToF camera are undesirably removed as noise.

SUMMARY

According to an aspect of the present disclosure, there is provided a method for generating point cloud data. The method for generating point cloud data includes generating two-dimensional color image data by capturing an image of a target object, classifying a plurality of pixels that form the color image data into one or more types to generate classified image data containing information on the plurality of pixels to each of which classification information is assigned, determining kernels associated with the one or more types, the kernels having sizes according to sizes of regions formed of pixels that belong to the one or more types, generating first data on a point cloud formed of points each identified in a three-dimensional coordinate system by capturing an image of the target object, projecting the first data onto a plane to generate second data on a point cloud formed of points each corresponding to a point in the point cloud indicated by the first data and each identified in a two-dimensional coordinate system, associating a point of the point cloud contained in the second data with a pixel in the classified image data to classify the points of the point cloud contained in the first data into the one or more types via the points of the point cloud contained in the second data, and generating, from the first data, third data on a point cloud formed of points each identified in the three-dimensional coordinate system by filtering information associated with the points in the first data, the filtering using the kernels according to the types of the points contained in the first data.

DESCRIPTION OF EXEMPLARY EMBODIMENTS

A. First Embodiment

Figure 1:
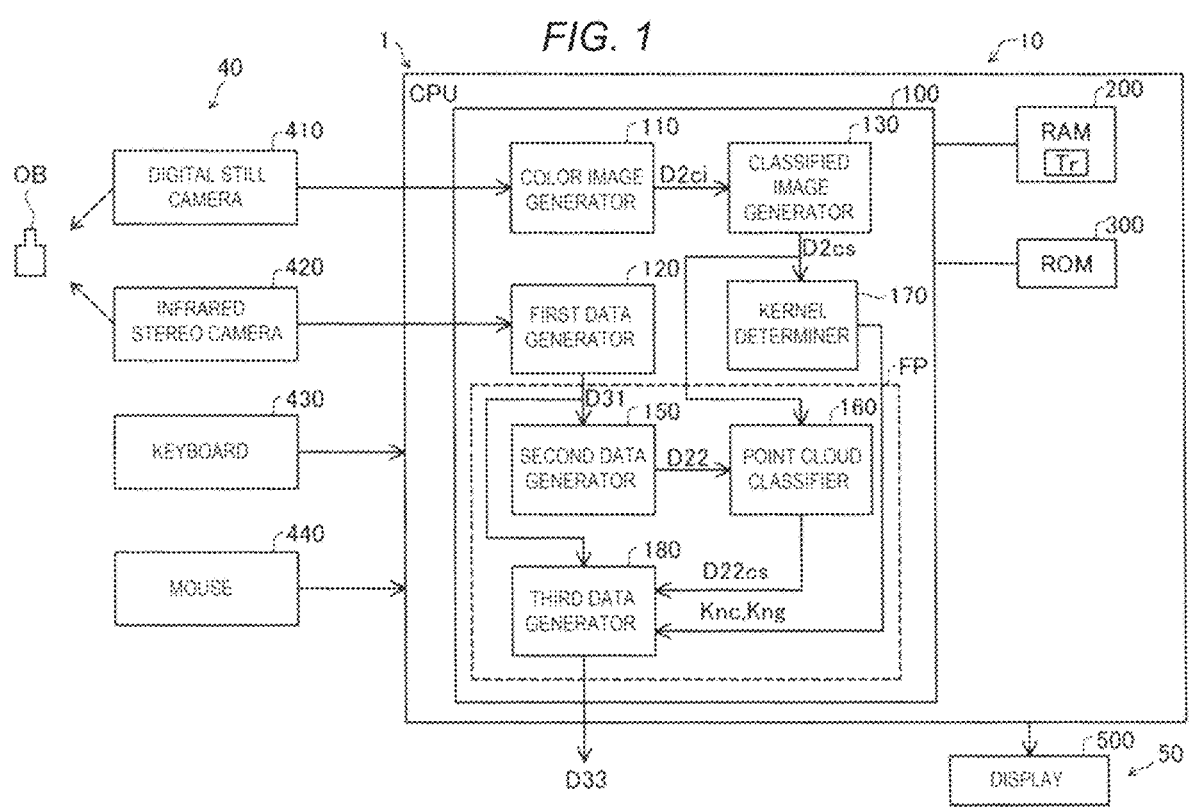
FIG. 1 is a block diagram showing the configuration of a data generating apparatus according to a first embodiment of the present disclosure.

FIG. 1 is a block diagram showing the configuration of a data generating apparatus 1 according to a first embodiment of the present disclosure. The data generating apparatus 1 generates point cloud data. The data generating apparatus 1 includes a computer 10, an input apparatus 40, and an output apparatus 50.

The computer 10 includes a CPU 100, which is a processor, a RAM 200, and ROM 300. The RAM 200 includes a main memory, which is a semiconductor memory, and a hard disk drive, which is an auxiliary storage apparatus. The hard disk drive stores a table Tr, which contains sizes of kernels used to generate the point cloud data. The table Tr will be described later. The CPU 100 receives data and instructions from the input apparatus 40 and loads a computer program stored on the hard disk drive into the main memory, and executes the computer program to achieve a variety of functions.

The output apparatus 50 is a display 500. The display 500 is specifically a liquid crystal display. The display 500 displays letters and images under the control of the CPU 100.

The input apparatus 40 includes a digital still camera 410, an infrared stereo camera 420, a keyboard 430, and a mouse 440. The keyboard 430 and the mouse 440 accept a user's operation and transmit the user's instructions to the computer 10.

The digital still camera 410 includes a CCD (charge coupled device) as an imaging device. The digital still camera 410 captures an image of an external target object OB to generate two-dimensional color image data D2$ci$ and transmits the generated data to the computer 10. A functional portion of the CPU 100, the portion that controls the digital still camera 410 to acquire the color image data D2$ci$ from the digital still camera 410, is shown as a color image generator 110 in FIG. 1.

The infrared stereo camera 420 includes two infrared cameras having the same configuration. The infrared cameras each include an InGaAs device as the imaging device. The infrared cameras each receive infrared light emitted by the target object OB and produce two-dimensional image data. The infrared stereo camera 420 generates two-dimensional image data generated by the two imaging apparatuses and containing the same target object OB and transmits the generated data to the computer 10.

Figure 2:
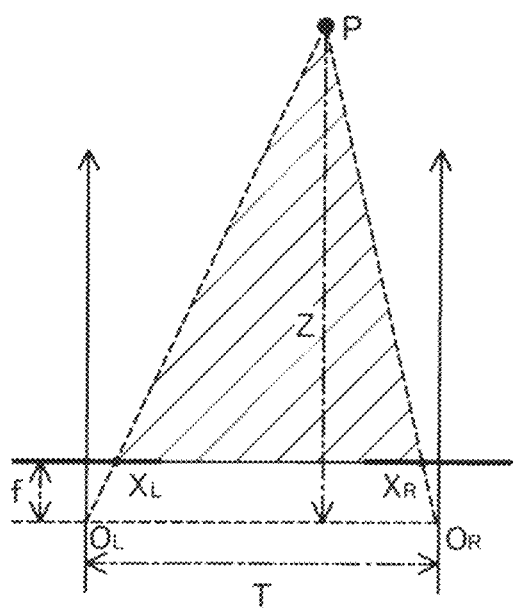
FIG. 2 is a descriptive diagram showing the principle of how to calculate the distance to a target object based on two sets of image data.

FIG. 2 is a descriptive diagram showing the principle of how to calculate the distance to the target object based on the two sets of image data. In FIG. 2, reference character P represents a single point on the target object OB. Reference character f represents the focal length of each of the infrared cameras. Reference character OL represents the optical center of one of the cameras. Reference character OR represents the optical center of the other camera. Reference character T represents the distance between the optical center OL of the one camera and the optical center OR of the other camera. Reference character XL represents the x coordinate of the one camera in a perspective projection plane. Reference character XR represents the x coordinate of the other camera in the perspective projection plane. Reference character Z represents the distance along the axis z from the optical center of each of the cameras to the single point P on the target object OB.

Since a triangle [OL-P-OR] and a triangle [XL-P-XR] are similar to each other, Expression (1) below is satisfied.

[Math. 1]

$$T:Z=[T-X_L+X_R]:[Z-f] \qquad (1)$$

Solving Expression (1) for Z provides Expression (2) below.

[Math. 2]

$$Z = \frac{fT}{X_L - X_R}. \qquad (2)$$

Similarly, in calculation of a three-dimensional position in a sensor coordinate system, the position (x, y, z) of the point P on the target object OB in the three-dimensional space is determined by Expression (3) below. The coordinate system in the three-dimensional space is the coordinate system of the one camera having an origin being the optical center OL of the one camera. Reference character YL represents the y coordinate of the one camera in the perspective projection plane.

[Math. 3]

$$x = \frac{X_L T}{X_L - X_R}$$
$$y = \frac{Y_L T}{X_L - X_R} \qquad (3)$$
$$z = \frac{fT}{X_L - X_R}.$$

Based on the principle described above, the CPU 100 causes the infrared stereo camera 420 to capture images of the target object OB, and generates, from the two sets of image data generated by the infrared stereo camera 420, first data D31 on point clouds formed of points each identified in the three-dimensional coordinate system. The coordinates of each of the points of the point clouds indicated by the first data D31 are expressed as (x, y, z). A functional portion of the CPU 100, the portion that generates the first data D31 by using the infrared stereo camera 420 to capture images the target object OB, is shown as a first data generator 120 in FIG. 1.

Figure 3:
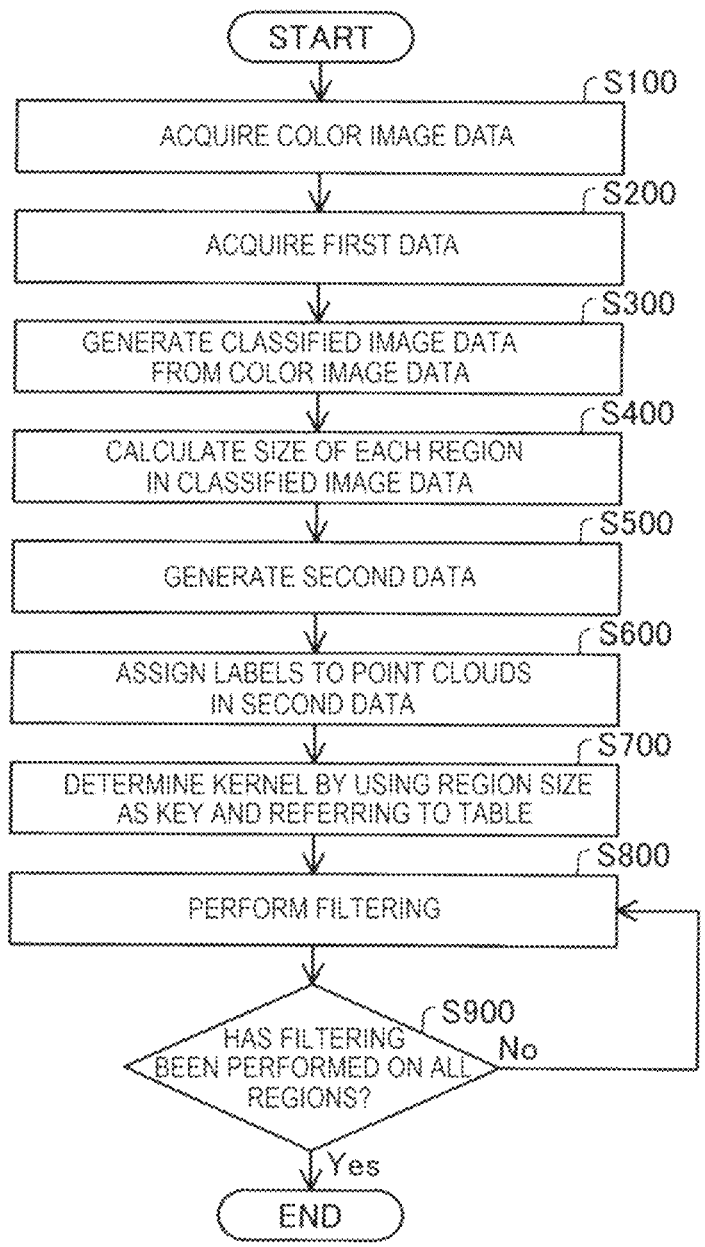
FIG. 3 is a flowchart showing the processes carried out by the data generating apparatus in a method for generating point cloud data.

FIG. 3 is a flowchart showing the processes carried out by the data generating apparatus 1 in a method for generating point cloud data. The processes in FIG. 3 are carried out by the CPU 100 of the computer 10.

Figure 4:
FIG. 4 shows an example of color image data.

FIG. 4 shows an example of the color image data D2$ci$. In step S100 in FIG. 3, the CPU 100 captures an image of the target object OB with the digital still camera 410 to acquire the two-dimensional color image data D2$ci$. The function of step S100 is achieved by the color image generator 110 as a functional portion of the CPU 100 (see upper central portion of FIG. 1).

Figure 5:
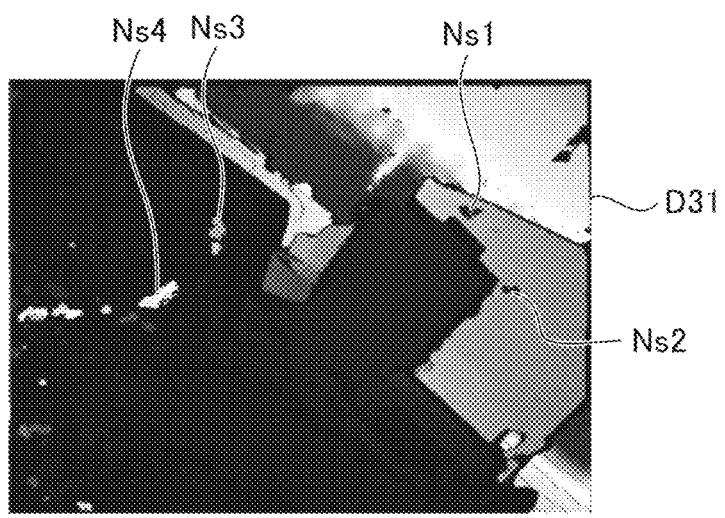
FIG. 5 shows an example of first data.

FIG. 5 shows an example of the first data D31. Target objects shown in the image indicated by the first data D31 in FIG. 5 correspond to target objects shown in the image indicated by the color image data D2$ci$ in FIG. 4. In step S200 in FIG. 3, the CPU 100 captures images of the target object OB with the infrared stereo camera 420 to generate the first data D31 on the point clouds formed of points each identified in the three-dimensional coordinate system. In FIG. 5, the pixels that form the image are each colored in accordance with the distance in the depth direction to the point, on the target object, indicated by the pixel. The function of step S200 is achieved by the first data generator 120 as a functional portion of the CPU 100 (see central portion of FIG. 1).

As can be seen by comparison between FIGS. 4 and 5, the first data D31 shows portions Ns1 and Ns2 on a whiteboard, which is a flat surface, separate from the data generating apparatus 1 by distances clearly different from distances by which the surroundings are separate therefrom. The first data D31 further shows portions Ns3 and Ns4 on a liquid crystal display, which is a flat surface, separate from the data generating apparatus 1 by distances clearly different from distances by which the surroundings are separate therefrom. The portions Ns1 to Ns4 are noise produced when the depth position of each point is calculated based on the two sets of image data.

In step S300 in FIG. 3, the CPU 100 classifies the plurality of pixels that form the color image data D2$ci$ into one or more types. The CPU 100 then generates classified image data D2$cs$ containing information on the plurality of pixels to each of which classification information Is representing the classification types is assigned. The pixels in the classified image data D2$cs$ are each further labeled. The label is information representing the result of estimation of the target object indicated by the region to which the pixel belongs. A functional portion of the CPU 100, the portion that achieves the function of step S300, is shown as a classified image generator 130 in FIG. 1 (see upper central portion of FIG.

In step S300, semantic segmentation is specifically performed. In the semantic segmentation, for each region where a target object is present in the image, the target object is identified, and the category of the target object is estimated. The classification information Is is also called an "index".

Figure 6:
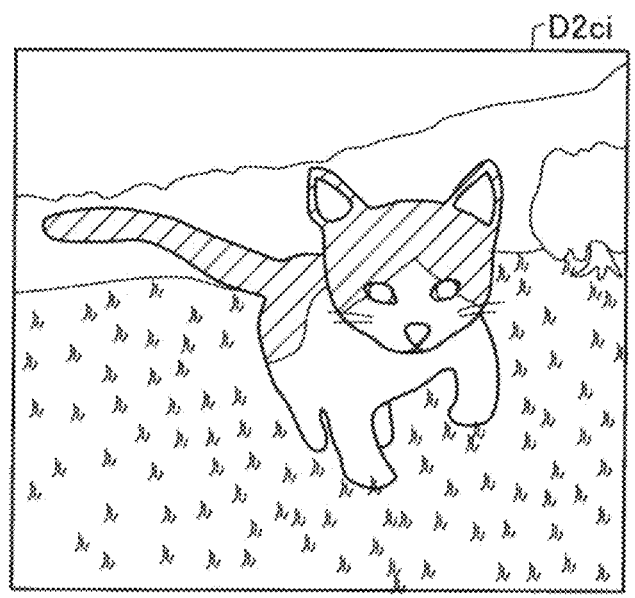
FIG. 6 shows another example of the color image data acquired in step S100.

FIG. 6 shows another example of the color image data D2$ci$ acquired in step S100 in FIG. 3. The example shown in FIG. 6 is a landscape with a cat on a grassy field against a forest as the background.

Figure 7:
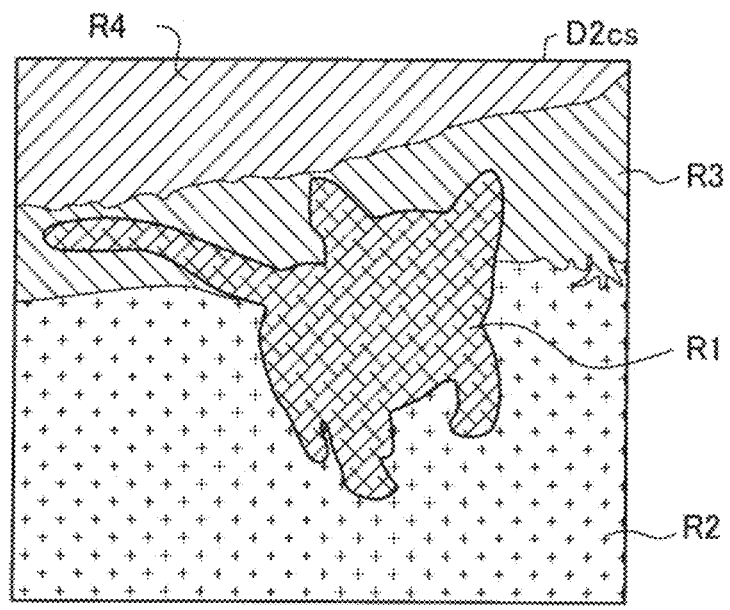
FIG. 7 shows an example of classified image data.

FIG. 7 shows an example of the classified image data D2$cs$. In the example shown in FIG. 7, a number of "1" is assigned as the classification information Is to the cat in the image indicated by color image data D2$ci$. The region of the pixels to which "1" has been assigned as the classification information Is in the image indicated by the classified image data D2$cs$ is shown as a region R1 in FIG. 7. A number of "2" is assigned as the classification information Is to the grassy field in the image indicated by color image data D2$ci$. The region of the pixels to which "2" has been assigned as the classification information Is in the image indicated by the classified image data D2$cs$ is shown as a region R2.

In the example shown in FIG. 7, a number of "3" is assigned as the classification information Is to the forest in the image indicated by the color image data D2$ci$. *The region of the pixels to which "3" has been assigned as the classification information Is in the image indicated by the classified image data D2$cs$ is shown as a region R3 in FIG. 7. A* number of "4" is assigned as the classification information Is to the sky in the image indicated by the color image data D2$ci$. The region of the pixels to which "4" has been assigned as the classification information Is in the image indicated by the classified image data D2$cs$ is shown as a region R4.

The classified image data D2$cs$ can be expressed as an image in which each pixel is colored by referring to a color palette that associates the classification information Is with colors. The image is also called a "segmentation map".

In the example shown in FIG. 7, a label representing the "cat" is assigned to the region R1 in the image indicated by the classified image data D2$cs$. A label representing the "grassy field" is assigned to the region R2 in the image indicated by the classified image data D2$cs$. A label representing the "forest" is assigned to the region R3 in the image indicated by the classified image data D2$cs$. A label representing the "sky" is assigned to the region R4 in the image indicated by the classified image data D2$cs$.

In step S400 in FIG. 3, the CPU 100 calculates the size of each of the regions in the image indicated by the classified image data D2$cs$. The size of each of the regions is specifically expressed in the form of the number of pixels contained in the region.

In step S500 in FIG. 3, the CPU 100 projects each point in the three-dimensional space indicated by the first data D31 onto a plane to generate second data D22 on point clouds formed of points that correspond to the points of the point clouds in the first data D31 and are each identified in the two-dimensional coordinate system. The coordinates of each of the points of the point clouds indicated by the second data D22 are expressed as (u, v). To project each point indicated by the first data D31 in the three-dimensional space onto a plane, the focal length of the infrared stereo camera 420, an offset of the origin between the three-dimensional space and the two-dimensional plane, and other parameters are taken into account. A functional portion of the CPU 100, the portion that achieves the function of step S500, is shown as a second data generator 150 in FIG. 1 (see central portion of FIG. 1).

Figure 8:
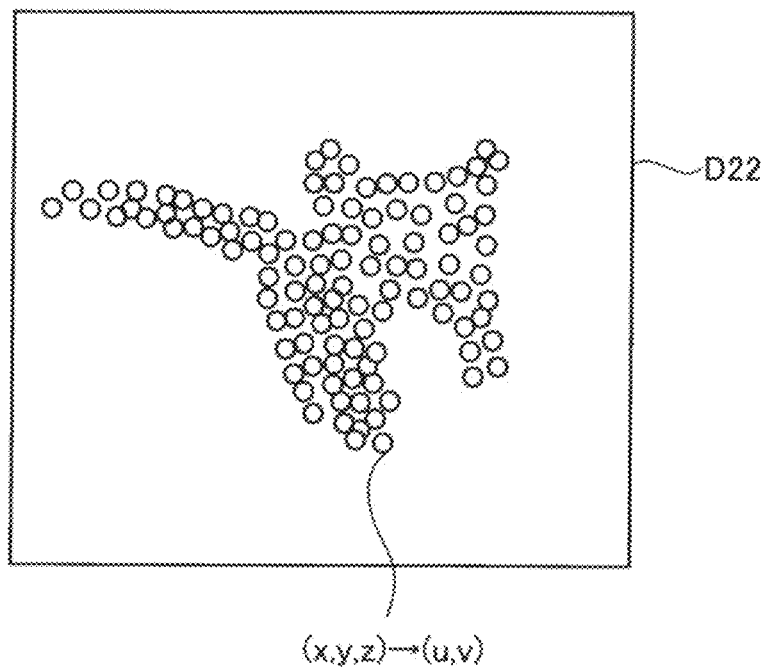
FIG. 8 shows an example of a point cloud contained in second data.

FIG. 8 shows an example of a point cloud contained in the second data D22. FIG. 8 shows a point cloud in the second data D22 in the case where the infrared stereo camera 420 is used to generate the first data D31 on the same target object as in the example shown in FIG. 6 and the second data D22 is generated based on the first data D31. FIG. 8 shows only the point cloud representing the cat out of the point clouds in the second data D22 to facilitate understanding of the technology.

In step S600 in FIG. 3, the CPU 100 associates the points of the point clouds contained in the second data D22 with the pixels in the classified image data D2$cs$. As a result, the points of the point clouds contained in the second data D22 are each associated with any of the pixels and types thereof in the classified image data D2$cs$. The CPU 100 then classifies the points of the point clouds contained in the first data D31 via the points of the point clouds contained in the second data D22 that correspond to the points of the point clouds in the first data D31 into the one or more types associated with the pixels in the classified image data D2$cs$. As a result, the classification information Is and a label are assigned to each of the points of the point clouds contained in the first data D31. A functional portion of the CPU 100, the portion that achieves the function of step S600 is shown as a point cloud classifier 160 in FIG. 1 (see central portion of FIG. 1).

Figure 9:
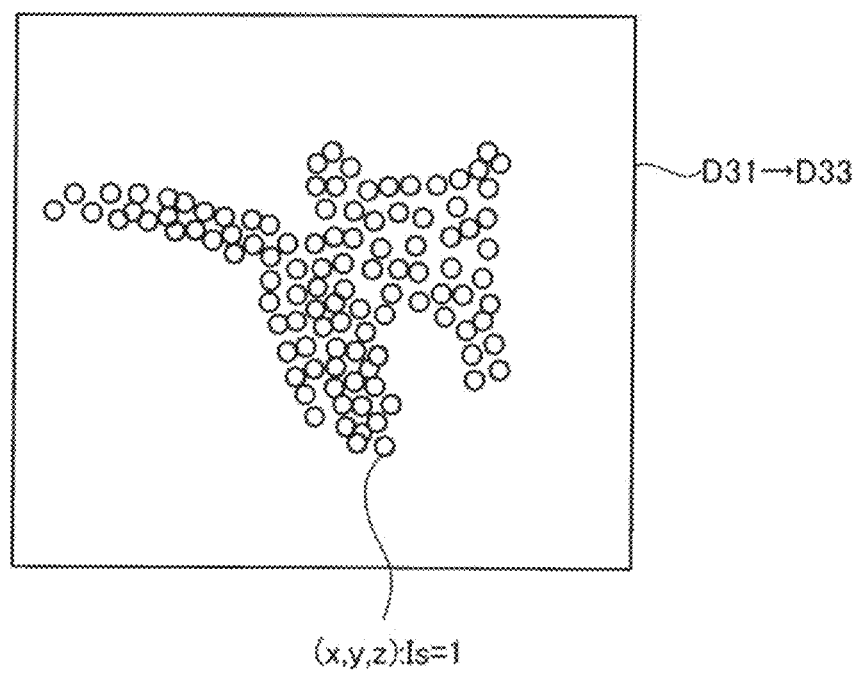
FIG. 9 shows an example of classification information assigned to the points of point clouds contained in the first data via the points of point clouds contained in the second data.

FIG. 9 shows an example of the classification information Is assigned to the points of the point clouds contained in the first data D31 via the points of the point clouds contained in the second data D22. FIG. 9 shows only the point cloud representing the cat out of the point clouds in the first data D31 to facilitate understanding of the technology. Since the points shown in FIG. 8 in the second data D22 represent the cat, "1" is assigned as the classification information Is to each of the points contained in the first data D31 that correspond to the points shown in FIG. 8 in the second data D22. The label representing the "cat" is further assigned to each of the points contained in the first data D31 that correspond to the points shown in FIG. 8 in the second data D22.

In step S700 in FIG. 3, the CPU 100 determines kernels associated with the point types. The kernels each have a size according to the size of the region formed of pixels that belong to each of the point types in the classified image data D2cs. Specifically, the CPU 100 determines the size of each of the kernels by referring to the table Tr. Carrying out the process described above, which is a simple process, allows determination of the size of each of the kernels. The CPU 100 determines a weight coefficient in each element of each of the kernels by referring to other data prepared in advance. A functional portion of the CPU 100, the portion that achieves the function of step S700 is shown as a kernel determiner 170 in FIG. 1 (see central portion of FIG. 1).

Figure 10:
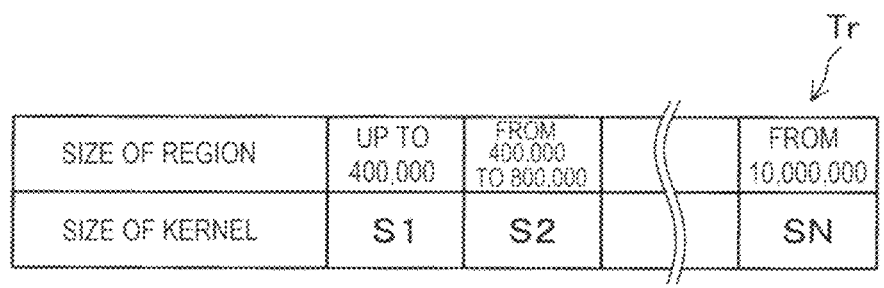
FIG. 10 shows an example of a table.

FIG. 10 shows an example of the table Tr. The table Tr stores sizes defined in accordance with the sizes of the regions formed of pixels that belong to the point types. In the example shown in FIG. 10, the table Tr stores fixed kernel sizes S1 to SN (N is positive integer) associated with the sizes of the regions expressed by the number of pixels. For example, in the classified image data D2cs shown in FIG. 7, when the region R1, to which "1" is assigned as the classification information Is, has a size of 300,000 pixels, and the region R2, to which "2" is assigned as the classification information Is, has a size of 600,000 pixels, the size S1 of the kernel determined for the type of the points to which "1" is assigned as the classification information Is is smaller than the size S2 of the kernel determined for the type of the points to which "2" is assigned as the classification information Is.

Figure 11:
FIG. 11 shows an example of a kernel.

FIG. 11 shows a kernel Knc, which is an example of the kernel. The kernel Knc is a moving average filter having a size of 2×2. The four elements each store a weight of ¼.

Figure 12:
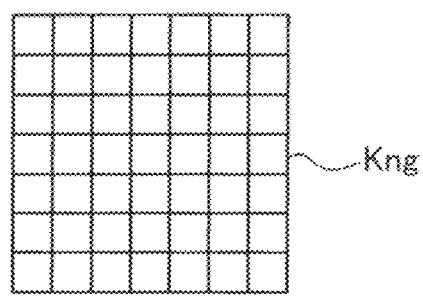
FIG. 12 shows another example of the kernel.

FIG. 12 shows a kernel Kng, which is an example of the kernel. The kernel Kng is a moving average filter having a size of 7×7. The forty-nine elements each store a weight of 1/49. Filtering using the kernels Knc and Kng will be described later.

In step S800 in FIG. 3, the CPU 100 uses kernels according to the types of the points contained in the first data D31 to filter the information associated with the points in the first data D31. Specifically, the filtering is performed on the depth of each of the points in the first data D31 for each of the types to which each of the points belongs. The "depth" is information representing the position in the axis-z direction, which is the direction away from the camera, out of the three axes that define the three-dimensional space and are perpendicular to one another. The types of the points contained in the first data D31 have been determined in step S600. In step S800, the CPU 100 performs the filtering for each of the types on the depth of a point that belongs to the type.

The CPU 100 evaluates in step S900 whether or not all the filtering has been performed on all the types of the points contained in the first data D31. When there are one or more types that have not yet been filtered, the CPU 100 returns to the process in step S800. In step S800, the filtering is performed on the point types that have not yet been filtered. When the filtering has been performed on all the types of the points contained in the first data D31, the entire process is terminated.

When the process in step S800 is repeatedly carried out in conjunction with step S900, third data D33 is generated from the first data D31. The third data D33 is data on point clouds formed of points each identified in the three-dimensional coordinate system. The points contained in the third data D33 are associated with the classification information Is and labels associated with the corresponding points contained in the first data D31. A functional portion of the CPU 100, the portion that achieves the functions of steps S800 and S900 is shown as a third data generator 180 in FIG. 1 (see lower central portion of FIG. 1).

The filtering performed in step S800 is filtering that removes noise from the depth information that the point clouds have. Specifically, the smoothing filters illustrated in FIGS. 11 and 12 are used in step S800. For example, smoothing performed by using the kernel Kng is stronger than the smoothing performed by using the kernel Knc, which is smaller than the kernel Kng.

In the data generating apparatus 1 according to the present embodiment, capturing images of the target object OB with the infrared stereo camera 420 generates the first data D31 on the point clouds formed of points each identified in the three-dimensional coordinate system (see S200 in FIG. 3). The third data D33, which is not based on CAD data on the target objects but in which the classification information Is and labels are assigned to the points, can thus be generated. Also for a flexible elastic object that does not maintain the shape specified by CAD data when placed in the real world, the third data D33 in which the classification information Is and labels are assigned to the points can be generated.

In the data generating apparatus 1 according to the present embodiment, the filtering is performed on the depths of the points in the first data D31 (see S800 in FIG. 3). The data generating apparatus 1 can therefore generate the third data D33, which is data containing little noise on point clouds formed of points each identified in the three-dimensional coordinate system.

In the data generating apparatus 1 according to the present embodiment, the kernels of the filters used to generate the third data D33 are determined in accordance with the sizes of the regions of the types in the classified image data D2cs (see S700 in FIG. 3). Therefore, for example, a small kernel is determined to be used for a target object that is located at a distant position and hence appears as a small target object in the two-dimensional color image data D2ci. The points corresponding to the distant target object are therefore unlikely to be equally processed as noise.

B. Second Embodiment

In the first embodiment, the semantic segmentation is performed in step S300. In a second embodiment, however, instance segmentation is performed in step S300. The other points in the second embodiment are the same as those in the first embodiment.

Figure 13:
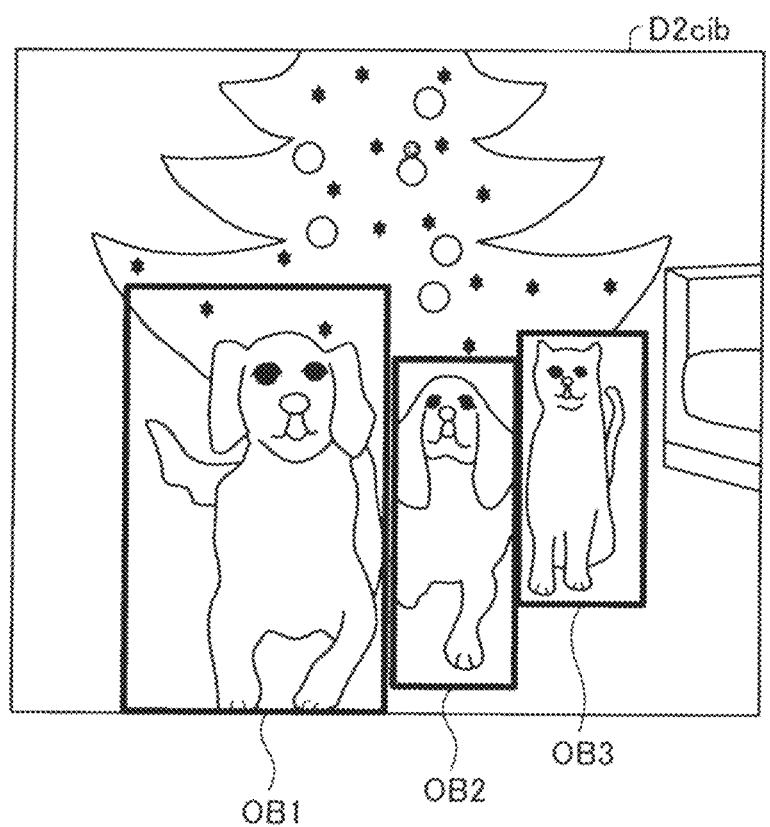
FIG. 13 shows still another example of color image data acquired in step S100.

FIG. 13 shows color image data D2cib acquired in step S100. In the example shown in FIG. 13, two dogs and one cat are drawn against a Christmas tree as the background. The two dogs in the image indicated by the color image data D2cib are shown as target objects OB1 and OB2. The cat in the image indicated by the color image data D2cib is shown as a target object OB3. Rectangular frames indicating the target objects OB1, OB2, and OB3 are displayed in FIG. 13 to facilitate understanding of the technology.

In the semantic segmentation, for each region where a target object is present in the image, the target object is identified, and the category of the target object is estimated. In the semantic segmentation, target objects that belong to the same category are not distinguished from each other. For example, when an image shows a plurality of cats, the same classification information Is=1 is assigned to the region occupied by the plurality of cats, and the same label "cat" is assigned to the region.

In contrast, in the instance segmentation, target objects in an image are distinguished from one another in addition to identification of categories of the target objects. For example, when an image shows a plurality of dogs, different pieces of classification information Is are assigned to the regions occupied by the dogs, and different labels "dog 1", "dog 2", and so one are assigned to the regions.

Figures 14, 15:
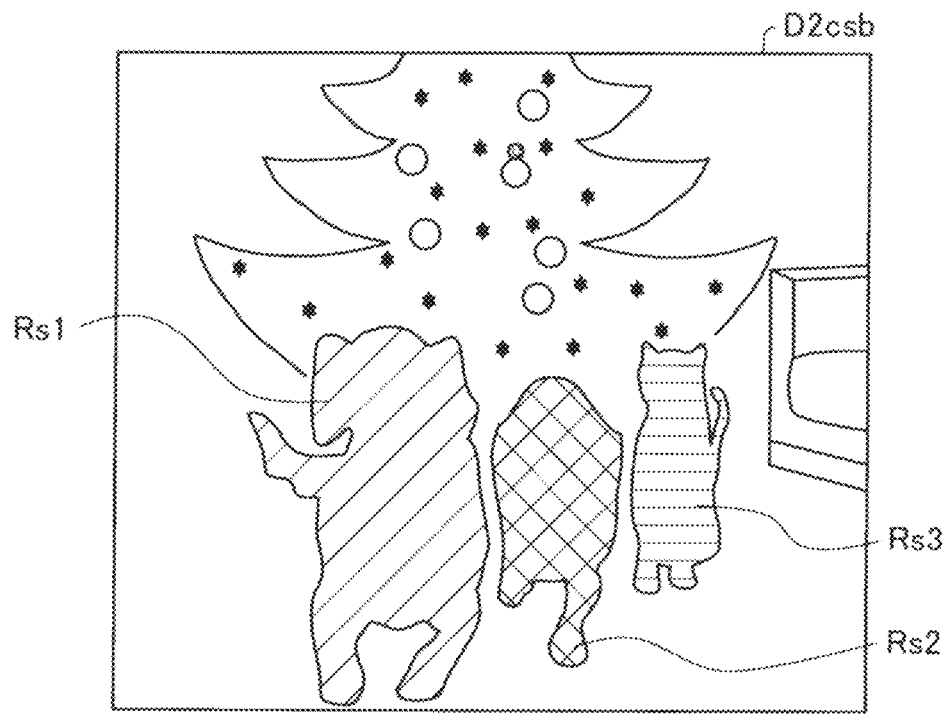
FIG. 14 shows another example of the classified image data.
FIG. 15 is a table showing comparison in terms of performance among a case where a stereo camera is used, a case where a ToF camera is used, and a case where a structured illumination apparatus and a camera are used as the configuration that generates the first data by capturing an image of a target object.

FIG. 14 shows an example of classified image data D2csb. In the example shown in FIG. 14, the number of "1" is assigned as the classification information Is to one of the dogs in the image indicated by the color image data D2cib. The region of the pixels to which "1" has been assigned as the classification information Is in the image indicated by the classified image data D2csb is shown as a region R1s. The number of "2" is assigned as the classification information Is to the other dog in the image indicated by the color image data D2cib. The region of the pixels to which "2" has been assigned as the classification information Is in the image indicated by the classified image data D2csb is shown as a region R2s. The number of "3" is assigned as the classification information Is to the cat in the image indicated by the color image data D2cib. The region of the pixels to which "3" has been assigned as the classification information Is in the image indicated by the classified image data D2csb is shown as a region R3s.

Even when the semantic segmentation is performed in step S300 in FIG. 3, the process in step S400 and the following processes can be appropriately carried out. As a result, the possibility of the situation in which points corresponding to distant target objects are equally processed as noise can be lowered.

C. Other Embodiments

C1. Other Embodiment 1

(1) The color image data D2ci may be data representing an RGB image in which colors are expressed by combinations of grayscales of three colors, red, green, and blue, data representing an image in which colors are expressed in the L*a*b* color system, or data representing an image in which colors are expressed in the xyz color system (see FIGS. 4 and 6).

(2) In the first embodiment described above, the data generating apparatus 1 includes the infrared stereo camera 420 (see middle left portion of FIG. 1). Thereafter, in the process in step S200 in FIG. 3, the first data D31 on the point clouds formed of points each identified in the three-dimensional coordinate system is generated from the two sets of image data generated by the infrared stereo camera 420.

The data generating apparatus, which generates point cloud data, may, however, include a ToF camera in place of the infrared stereo camera 420 or may include a structured illumination apparatus and a camera. The first data D31 on the point clouds formed of points each identified in the three-dimensional coordinate system may be generated by using a ToF (Time of Flight) camera such as LiDAR. The first data D31 may still instead be generated by using a structured illumination apparatus and a camera.

A ToF (time of flight) camera radially emits light and generates data on point clouds formed of points in the three-dimensional coordinate system based on the period of time spent until the camera receives the reflected light.

When the combination of a structured illumination apparatus and a camera is used, the following process is carried out. That is, light having a fixed pattern is outputted toward a target object. Based on the shape of the pattern that appears on the surface of the target object when the light is incident on the target object, three-dimensional point cloud data is generated.

FIG. 15 is a table showing comparison in terms of performance among the case where a stereo camera is used, the case where a ToF camera is used, and the case where a structured illumination apparatus and a camera are used as the configuration that generates the first data D31 by capturing an image of the target object OB. In the table shown in FIG. 15, the performance comparison is made for each of the following evaluation items: (i) the imaging distance, that is, whether or not an image of a distant target object can be captured; (ii) accuracy of the distance in the depth direction; (iii) load exerted on the computer in the generation of the point cloud data; (iv) the ability to generate the point cloud data in response to changes in the target object in real time; (v) the ability to generate accurate point cloud data even in image capturing at a dark place; (vi) the ability to generate accurate point cloud data even in image capturing under direct sunlight; (vii) compactness of the apparatus, and (viii) cost of the apparatus.

In the table, "A" represents superiority over "B", "C", and "D". "B" represents superiority over "C" and "D". "C" represents superiority over "D". As shown in the row representing "DEPTH ACCURACY", the accuracy of the calculation of the distance in the direction away from the camera ranges from 0.1 to 10 cm for the stereo camera, from 1 to 10 cm for the ToF camera, and 0.1 to 1 mm when a camera is used in combination with a structured illumination apparatus.

(3) In the first embodiment described above, the digital still camera 410 captures an image of the external target object OB to generate the two-dimensional color image data D2ci and transmits the generated data to the computer 10 (see upper left portion of FIG. 1). However, for example, in the form in which a stereo camera using visible light for image capturing in place of the infrared stereo camera 420, the two-dimensional color image data may be one of the images generated by the stereo camera.

(4) In the first embodiment described above, in step S800 in FIG. 3, the filtering is performed on the depths of the points in the first data D31 for each of the types to which the points belong. The filtering may, however, be performed on any of the other parameters of the points of the point clouds, such as the horizontal position and angle of each of the points, and the vertical position and angle of each of the points. It is, however, preferable that the filtering is performed on part of the parameters greater than the other parameters in terms of possibility of introduction of noise produced in the parameter calculation.

(5) In the first embodiment described above, the kernel Knc has the size of 2×2 (see FIG. 11). The kernel Kng has the size of 7×7 (see FIG. 12). The kernel used when the filtering is performed may, however, have another configuration. Furthermore, a kernel having elements so configured that the number of vertical elements and the number of horizontal elements differ from each other can be used. In the present specification, the "size of the kernel" is the number of elements contained in the kernel.

(6) In the first embodiment described above, the table Tr stores the fixed kernel sizes S1 to SN (N is positive integer) associated with the sizes of the regions expressed by the number of pixels (see FIG. 10). The table that associates the size of a region with the size of a kernel may, however, have another form. For example, the table may associate the horizontal size of a region with the horizontal size of a kernel. The table may associate the vertical size of a region with the vertical size of a kernel.

(7) In the first embodiment described above, the smoothing filters shown by way of example in FIGS. 11 and 12 are used in step S800 in FIG. 3. However, for example, parameters that are significantly different from the average of the parameters that belong to each point on a target object can be removed, and may be replaced with values produced by interpolation based on the parameters that belong to the surrounding points.

(8) In the first embodiment described above, "cat", "grassy field", "forest", or any other label is assigned to each pixel in the classified image data D2cs (see FIG. 7). The label is information representing the result of estimation of the target object indicated by the region to which the pixel belongs. The pixels in the classified image data D2cs can, however, be unlabeled but indexed so that the attributes of the pixels are distinguished from one another.

(9) In the first embodiment described above, the points contained in the third data D33 are associated with the classification information Is and labels associated with the corresponding points contained in the first data D31 (see lower central portion of FIG. 1). When the first data D31 contains other information associated with the points therein, the points in the third data D33 may be associated with part or all of the information.

(10) In the first embodiment described above, the data generating apparatus 1 generates data on point clouds formed of points each identified in a three-dimensional coordinate system (see D33 in FIG. 1). The data generating apparatus may instead generate data having points each identified in a two-dimensional coordinate system. The filtering may be performed on the data having points each identified in the two-dimensional coordinate system. For example, noise may be removed from information on colors associated with the points each identified in the two-dimensional coordinate system.

C2. Other Embodiment 2

In the first embodiment described above, the filtering performed in step S800 in FIG. 3 is filtering that removes noise (see FIGS. 11 and 12). The filtering used in the technology of the present disclosure may, however, be filtering other than noise removing filtering.

C3. Other Embodiment 3

In the first embodiment described above, in step S700 in FIG. 3, the CPU100 determines the size of each kernel by referring to the table Tr. The size of the kernel applied to each region may instead be specified, for example, by inputting the size of the region into a function specified in advance.

In the table Tr in the first embodiment described above, a column closer to the right side shows a greater region size and a greater kernel size. That is, in a segment where the region has a greater size, the region is associated with a greater kernel size. In both the form in which a table is used and the form in which a function is used, the size of the kernel may increase substantially linearly with the size of the region, or may increase nonlinearly with the size of the region. There may also be segments where the size of the kernel remains constant even when the size of the region increases.

D. Other Aspects

The present disclosure is not limited to the embodiments described above and can be achieved in a variety of aspects to the extent that the aspects do not depart from the intent of the present disclosure. For example, the present disclosure can be achieved in the aspects below. The technical features in the embodiments described above that correspond to the technical features in the aspects described below can be replaced or combined with each other as appropriate to solve part or entirety of the problems cited in the present disclosure or achieve part or entirety of the effects of the present disclosure. Furthermore, when any of the technical features has not been described as an essential feature in the present specification, the technical feature can be deleted as appropriate.

(1) According to an aspect of the present disclosure, a method for generating point cloud data is provided. The method for generating point cloud data includes generating two-dimensional color image data by capturing an image of a target object, classifying a plurality of pixels that form the color image data into one or more types to generate classified image data containing information on the plurality of pixels to each of which classification information is assigned, determining kernels associated with the one or more types, the kernels having sizes according to the sizes of the regions formed of the pixels that belong to the one or more types, generating first data on a point cloud formed of points each identified in a three-dimensional coordinate system by capturing an image of the target object, projecting the first data onto a plane to generate second data on a point cloud formed of points each corresponding to a point in the point cloud indicated by the first data and each identified in a two-dimensional coordinate system, associating a point of the point cloud contained in the second data with a pixel in the classified image data to classify the points of the point cloud contained in the first data into the one or more types via the points of the point cloud contained in the second data, and generating, from the first data, third data on a point cloud formed of points each identified in the three-dimensional coordinate system by filtering information associated with the points in the first data, the filtering using the kernels according to the types of the points contained in the first data.

In the aspect described above, the kernels of the filter used to generate the third data are determined in accordance with the sizes of the regions corresponding to the types in the classified image data. Therefore, for example, a small kernel is determined to be used for a target object that is located far away and therefore appears as a small target object in the two-dimensional color image data. The points corresponding to the distant target object are therefore unlikely to be equally processed as noise.

(2) In the data generating method according to the aspect described above, the filtering may be noise removing filtering.

In the aspect described above, for example, points corresponding to a distant target object are unlikely to be equally removed as noise.

(3) In the data generating method according to the aspect described above, determining the kernel may include determining the size of the kernel by referring to a table that stores sizes specified in accordance with the sizes of the regions formed of the pixels that belong to the one or more types.

In the aspect described above, the size of the kernel can be determined by the simple process.

(4) According to another aspect of the present disclosure, a data generating apparatus that generates point cloud data is provided. The data generating apparatus that generates point cloud data includes a color image generator that generates two-dimensional color image data by capturing an image of a target object, a classified image data generator that classifies a plurality of pixels that form the color image data into one or more types to generate classified image data containing information on the plurality of pixels to each of which classification information is assigned, a kernel determiner that determines a kernel associated with each of the one or more types, the kernel having a size according to the size of a region formed of the pixels that belong to each of the one or more types, a first data generator that generates first data on a point cloud formed of points each identified in a three-dimensional coordinate system by capturing an image of the target object, a second data generator that projects the first data onto a plane to generate second data on a point cloud formed of points each corresponding to a point in the point cloud indicated by the first data and each identified in a two-dimensional coordinate system, a point cloud classifier that associates a point of the point cloud contained in the second data with a pixel in the classified image data to classify the points of the point cloud contained in the first data into the one or more types via the points of the point cloud contained in the second data, and a third data generator that generates, from the first data, third data on a point cloud formed of points each identified in the three-dimensional coordinate system by filtering information associated with the points in the first data, the filtering using the kernels according to the types of the points contained in the first data.

In the aspect described above, the kernels of the filter used to generate the third data are determined in accordance with the sizes of the regions corresponding to the types in the classified image data. Therefore, for example, a small kernel is determined to be used for a target object that is located far away and therefore appears as a small target object in the two-dimensional color image data. The points corresponding to the distant target object are therefore unlikely to be equally processed as noise.

(5) In the data generating apparatus according to the aspect described above, the filtering may be noise removing filtering.

In the aspect described above, for example, points corresponding to a distant target object are unlikely to be equally removed as noise.

(6) In the data generating apparatus according to the aspect described above, the kernel determiner may determine the size of the kernel by referring to a table that stores sizes specified in accordance with the sizes of the regions formed of the pixels that belong to the one or more types.

In the aspect described above, the size of the kernel can be determined by the simple process.

The present disclosure can also be implemented in a variety of aspects other than a data generating method or a data generating apparatus. For example, the present disclosure can be achieved in the form of a data processing method, a data processing apparatus, a computer program that achieves a data generating method or a data processing method, and a non-transitory recording medium and other media on which the computer program is recorded.

What is claimed is:

1. A method for generating point cloud data to cause a processor to execute a process, the method comprising executing on the processor the steps of:
    generating two-dimensional color image data by capturing an image of a target object, the target object including a plurality of sub-target objects;
    classifying a plurality of pixels that form the color image data into three or more categories to generate classified image data containing information on the plurality of pixels, the three or more categories corresponding to indexes that are determined by identifying each of the plurality of sub-target objects using a semantic segmentation method;
    determining kernels associated with the three or more categories, the kernels having sizes according to sizes of the plurality of sub-target objects formed of pixels that belong to the three or more categories;
    generating first data on a point cloud formed of points each identified in a three-dimensional coordinate system by capturing an image of the target object using an infrared stereo camera;
    projecting the first data onto a plane to generate second data on a point cloud formed of points each corresponding to a point in the point cloud indicated by the first data and each identified in a two-dimensional coordinate system;
    associating a point of the point cloud contained in the second data with a pixel in the classified image data to classify the points of the point cloud contained in the first data into the three or more categories via the points of the point cloud contained in the second data; and
    generating, from the first data, third data on a point cloud formed of points each identified in the three-dimensional coordinate system by filtering information associated with the points in the first data, the filtering using the kernels according to the categories of the points contained in the first data.

2. The method for generating point cloud data according to claim 1,
    wherein the filtering is noise removing filtering.

3. The method for generating point cloud data according to claim 1,
    wherein determining the kernels includes determining the sizes of the kernels by referring to a table that stores sizes specified in accordance with the sizes of the plurality of sub-target objects formed of the pixels that belong to the three or more categories.

4. A data generating apparatus that generates point cloud data, the data generating apparatus comprising:
    a memory configured to store a program; and
    a processor configured to execute the program so as to:
        generate two-dimensional color image data by capturing an image of a target object, the target object including a plurality of sub-target objects;

classify a plurality of pixels that form the color image data into three or more categories to generate classified image data containing information on the plurality of pixels, the three or more categories corresponding to indexes that are determined by identifying each of the plurality of sub-target objects using a semantic segmentation method;

determine kernels associated with the three or more categories, the kernels having sizes according to sizes of the plurality of sub-target objects formed of pixels that belong to the three or more categories;

generate first data on a point cloud formed of points each identified in a three-dimensional coordinate system by capturing an image of the target object using an infrared stereo camera;

project the first data onto a plane to generate second data on a point cloud formed of points each corresponding to a point in the point cloud indicated by the first data and each identified in a two-dimensional coordinate system;

associate a point of the point cloud contained in the second data with a pixel in the classified image data to classify the points of the point cloud contained in the first data into the three or more categories via the points of the point cloud contained in the second data; and generate, from the first data, third data on a point cloud formed of points each identified in the three-dimensional coordinate system by filtering information associated with the points in the first data, the filtering using the kernels according to the categories of the points contained in the first data.

5. The data generating apparatus according to claim 4, wherein the filtering is noise removing filtering.

6. The data generating apparatus according to claim 4, wherein the kernel determiner determines the sizes of the kernels by referring to a table that stores sizes specified in accordance with the sizes of the plurality of sub-target objects formed of the pixels that belong to the three or more categories.

* * * * *